United States Patent
Amos et al.

(10) Patent No.: US 7,375,157 B2
(45) Date of Patent: May 20, 2008

(54) MELT-PROCESSIBLE POLYMER COMPOSITION COMPRISING FLUOROPOLYMER HAVING LONG CHAIN BRANCHES

(75) Inventors: Stephen E. Amos, Minneapolis, MN (US); Klaus Hintzer, Kastl (DE); Harald Kaspar, Burgkirchen (DE); Claude Lavallée, London (CA)

(73) Assignee: 3M Innovative Properties Company, St. Paul, MN (US)

( * ) Notice: Subject to any disclaimer, the term of this patent is extended or adjusted under 35 U.S.C. 154(b) by 246 days.

(21) Appl. No.: 10/864,054

(22) Filed: Jun. 9, 2004

(65) Prior Publication Data

US 2004/0260022 A1    Dec. 23, 2004

Related U.S. Application Data

(60) Provisional application No. 60/477,084, filed on Jun. 9, 2003.

(51) Int. Cl.
*C08L 83/04* (2006.01)

(52) U.S. Cl. .............. 524/500; 524/544; 524/545; 524/551

(58) Field of Classification Search ........... 524/500, 524/551, 544, 545
See application file for complete search history.

(56) References Cited

U.S. PATENT DOCUMENTS

| | | | |
|---|---|---|---|
| 3,125,547 A | 3/1964 | Blatz | |
| 3,876,654 A | 4/1975 | Pattison | |
| 4,214,060 A * | 7/1980 | Apotheker et al. | 525/387 |
| 4,233,421 A | 11/1980 | Worm | |
| 4,558,141 A | 12/1985 | Squire | |
| 4,612,357 A * | 9/1986 | Bekiarian et al. | 526/247 |
| 4,855,013 A | 8/1989 | Ohta et al. | |
| 4,904,735 A | 2/1990 | Chapman, Jr. et al. | |
| 4,912,171 A | 3/1990 | Grootaert et al. | |
| 4,983,677 A * | 1/1991 | Johnson et al. | 524/127 |
| 4,983,697 A * | 1/1991 | Logothetis | 526/206 |
| 5,015,693 A * | 5/1991 | Duchesne et al. | 525/187 |
| 5,064,594 A | 11/1991 | Priester et al. | |
| 5,086,123 A | 2/1992 | Guenthner et al. | |
| 5,132,368 A | 7/1992 | Chapman, Jr. et al. | |
| 5,262,490 A | 11/1993 | Kolb et al. | |
| 5,284,184 A | 2/1994 | Noone et al. | |
| 5,397,897 A | 3/1995 | Komatsu et al. | |
| 5,464,904 A | 11/1995 | Chapman, Jr. et al. | |
| 5,585,449 A | 12/1996 | Arcella et al. | |
| 5,591,804 A | 1/1997 | Coggio et al. | |
| 5,710,217 A * | 1/1998 | Blong et al. | 525/199 |
| 5,929,169 A | 7/1999 | Jing et al. | |
| 6,277,919 B1 | 8/2001 | Dillon et al. | |
| 6,294,604 B1 * | 9/2001 | Focquet et al. | 524/433 |
| 2001/0023280 A1 * | 9/2001 | Duvalsaint et al. | 526/79 |
| 2002/0040119 A1 * | 4/2002 | Tang | 526/247 |
| 2004/0242771 A1 * | 12/2004 | Kubo et al. | 525/55 |

FOREIGN PATENT DOCUMENTS

| | | |
|---|---|---|
| EP | 0 208 305 A2 | 1/1987 |
| EP | 1 462 465 A1 | 9/2004 |
| JP | 2002 012626 A | 1/2002 |
| WO | WO 02/066544 A2 | 8/2002 |

OTHER PUBLICATIONS

Rauwendaal, C., "Polymer Extrusion," Hansen Publishers, p. 23-48, 1986.
Rudin, A., et al, "Fluorocarbon Elastomer Aids Polyolefin Extrusion", *Plastics Engineering*, Mar. 1986, p. 63-66.
Shroff, R.N., H. Mavridis; *Macromolecules*, V. 32, p. 8454-8464 (1999).
Shroff, R.N., H. Mavridis, *Macromolecules*, V. 34, p. 7362-7367 (2001).
Westover, R.F., "Melt Extrusion", *Encyclopedia of Polymer Science and Technology*, v. 8, pp. 573-581 (John Wiley & Sons, 1968).
"Long chain branching in fluoroelastomers used as process aids for polyolefin extrusion," Research Disclosure, Disclosed by DuPont Performance Elastomers LLC, 503040, Mar. 2006, pp. 276-278.

* cited by examiner

*Primary Examiner*—Peter D. Mulcahy
*Assistant Examiner*—Henry S. Hu
(74) *Attorney, Agent, or Firm*—Brian E. Szymanski

(57) ABSTRACT

A polymer melt additive that is suitable for use as a processing aid in the extrusion of a non-fluorinated polymer. The polymer melt additive composition includes a fluoropolymer that has a long chain branching index (LCBI) of at least 0.2 and a zero shear rate viscosity at 265° C. of not more than $10^7$ Pa·s. The polymer melt additive may additionally include other compounds such as, polyoxyalkylene polymer or polycaprolactone.

12 Claims, No Drawings

MELT-PROCESSIBLE POLYMER COMPOSITION COMPRISING FLUOROPOLYMER HAVING LONG CHAIN BRANCHES

CROSS REFERENCE TO RELATED APPLICATION

This application claims priority to U.S. Provisional Patent Application No. 60/477,084, filed Jun. 9, 2003.

1. FIELD OF THE INVENTION

The present invention relates to melt-processible polymer compositions that comprise a mixture of a non-fluorinated melt-processible polymer and a fluoropolymer. The composition may be used as a polymer processing aid or the composition may be a composition ready to be processed into a desired article such as for example a polymer film.

2. BACKGROUND OF THE INVENTION

For any melt processible thermoplastic polymer composition, there exists a critical shear rate above which the surface of the extrudate becomes rough and below which the extrudate will be smooth. See, for example, R. F. Westover, Melt Extrusion, Encyclopedia of Polymer Science and Technology, Vol. 8, pp 573-81 (John Wiley & Sons 1968). The desire for a smooth extrudate surface competes, and must be optimized with respect to, the economic advantages of extruding a polymer composition at the fastest possible speed (i.e. at high shear rates).

Some of the various types of extrudate roughness and distortion observed in high and low density polyethylenes are described by A. Rudin, et al., Fluorocarbon Elastomer Aids Polyolefin Extrusion, Plastics Engineering, March 1986, at 63-66. The authors state that for a given set of processing conditions and die geometry, a critical shear stress exists above which polyolefins such as linear low-density polyethylene (LLDPE), high-density polyethylene (HDPE), and polypropylene suffer melt defects. At low shear rates, defects may take the form of "sharkskin", a loss of surface gloss that in more serious manifestations appears as ridges running more or less transverse to the extrusion direction. At higher rates, the extrudate can undergo "continuous melt fracture" becoming grossly distorted. At rates lower than those at which continuous melt fracture is first observed, LLDPE and HDPE can also suffer from "cyclic melt fracture", in which the extrudate surface varies from smooth to rough. The authors state further that lowering the shear stress by adjusting the processing conditions or changing the die configuration can avoid these defects to a limited extent, but not without creating an entirely new set of problems. For example, extrusion at a higher temperature can result in weaker bubble walls in tubular film extrusion, and a wider die gap can affect film orientation.

There are other problems often encountered during the extrusion of thermoplastic polymers. They include a build up of the polymer at the orifice of the die (known as die build up or die drool), increase in back pressure during extrusion runs, and excessive degradation or low melt strength of the polymer due to high extrusion temperatures. These problems slow the extrusion process either because the process must be stopped to clean the equipment or because the process must be run at a lower speed.

Certain fluorocarbon processing aids are known to partially alleviate melt defects in extrudable thermoplastic hydrocarbon polymers and allow for faster, more efficient extrusion. U.S. Pat. No. 3,125,547 to Blatz, for example, first described the use of fluorocarbon polymer process aids with melt-extrudable hydrocarbon polymers wherein the fluorinated polymers are homopolymers and copolymers of fluorinated olefins having an atomic fluorine to carbon ratio of at least 1:2 and wherein the fluorocarbon polymers have melt flow characteristics similar to that of the hydrocarbon polymers.

U.S. Pat. No. 4,904,735 (Chapman, Jr. et al.) describes a fluorinated processing aid for use with a difficultly melt-processable polymer comprising (1) a fluorocarbon copolymer which at the melt-processing temperature of the difficultly melt-processable polymer is either in a melted form if crystalline, or is above its glass transition temperature if amorphous, and (2) at least one tetrafluoroethylene homopolymer or copolymer of tetrafluoroethylene and at least one monomer copolymerizable therewith wherein the mole ratio is at least 1:1, and which is solid at the melt-processable temperature of the difficultly melt-processable polymer. U.S. Pat. No. 5,397,897 to Morgan et al. describes the use of copolymers of tetrafluoroethylene and hexafluoropropylene having high hexafluoropropylene content as processing aids in polyolefins.

U.S. Pat. Nos. 5,064,594 to Priester et al., and U.S. Pat. No. 5,132,368 to Chapman, Jr. et al. describe the use of certain fluoropolymer process aids containing certain functional polymer chain end groups for use with a difficultly melt-processable polymer.

U.S. Pat. No. 5,464,904 to Chapman et al. discloses the use of unimodal semicrystalline fluoroplastics such as copolymers of tetrafluoroethylene and hexafluoropropylene and terpolymers of tetrafluoroethylene, hexafluoropropylene and vinylidene fluoride with a polyolefin. The only enhancement of melt-processability described in this patent is shown in Example 25 where a concentration of 1000 ppm of the fluoropolymer in linear low density polyethylene is said to reduce the extrusion pressure of the extrudable composition. There is no showing of a reduction in melt defects.

U.S. Pat. Nos. 5,015,693 and 4,855,013 to Duchesne and Johnson disclose the use of a combination of a poly(oxyalkylene) polymer and a fluorocarbon polymer as a processing additive for thermoplastic hydrocarbon polymers. The poly(oxyalkylene) polymer and the fluorocarbon polymer are used at such relative concentrations and proportions as to reduce the occurrence of melt defects during extrusion. Generally the concentration of the fluoropolymer is present at a level of from 0.005 to 0.2 weight percent of the final extrudate and the poly(oxyalkylene) polymer is present at a level of from 0.01 to 0.8 weight percent of the final extrudate. Preferably, the weight of the fluorocarbon polymer in the extrudate and the weight of the poly(oxyalkylene) polymer in the extrudate are in a ratio of 1:1 to 1:10.

U.S. Pat. No. 5,710,217 to Blong et al. discloses an extrudable thermoplastic hydrocarbon composition that comprises an admixture of a melt processable hydrocarbon polymer as the major component and an effective amount of a chemically-resistant fluoropolymer process aid. The fluoropolymer contains at least 50% by weight of fluorine and comprises one or more fluoropolymers that are essentially completely ethylenically unsaturated.

U.S. Pat. No. 6,277,919 to Dillon et al. discloses a polymer processing additive containing a multimodal fluoropolymer and a polymer composition comprising the polymer melt additive. It is taught that the multi-modal character of the fluoropolymer reduces melt defects such as sharkskin in thermoplastic polymers and/or postpones the occurrence of these effects to higher extrusion rates than can be achieved without the use of a multi-modal fluoropolymer.

WO 02/066544 discloses a process aid for melt processible polymer that comprises a fluoropolymer. It is stated that the extrusion processibility of non-fluorinated melt-processable polymers is improved by introducing a fluoropolymer process aid by means whereby the weight average particle size of the fluoropolymer is greater than 2 microns as it reaches the extruder die entrance.

Despite the many existing processing aids based on fluoropolymers as known in the art, there continues to be a need to find further processing aids. Desirably, such processing aids are highly effective in reducing melt defects in the processing, in particular extrusion, of non-fluorinated melt-processible polymers. Preferably, the processing aid is capable of reducing die drool and/or reducing the back pressure during extrusion of the non-fluorinated polymer.

3. SUMMARY OF THE INVENTION

The invention provides a melt-processible polymer composition comprising (a) a non-fluorinated melt-processible polymer and (b) a fluoropolymer that has a long chain branching index (LCBI) of at least 0.2 and a zero shear rate viscosity at 265° C. of not more than $10^7$ Pa's.

It was found that such fluoropolymers are highly effective polymer processing aids in reducing the occurrence of melt defects such as sharkskin and melt fracture. In particular, these processing aids generally clear the melt of the non-fluorinated melt-processible polymer faster than the similar fluoropolymers that are linear or have a long chain branching index less than 0.2 and/or a zero shear rate viscosity at 265° C. of more than $10^7$ Pa's. Thus, the elapsed time after the extruder start up in which extruded articles exhibit a high degree of melt fracture before obtaining an extrudate having a smooth surface, free of melt fracture, may be reduced. Also, less fluoropolymer processing aid may be needed to reduce the melt defects and/or to reduce the time for clearance of the melt. Moreover, the fluoropolymer may also reduce the back pressure in the extrusion of the non-fluorinated melt-processible polymer.

The invention further provides a method for making the melt-processible polymer composition and to a polymer melt additive composition for use as a processing aid in the extrusion of a non-fluorinated polymer, the polymer melt additive composition comprising a fluoropolymer that has a long chain branching index (LCBI) of at least 0.2 and a zero shear rate viscosity at 265° C. of not more than $10^7$ Pa's and a synergist such as for example a polyoxyalkylene polymer or a polycarprolactone.

The invention in a still further aspect provides a polymer melt additive composition comprising a blend of at least two fluoropolymers that differ in their melt flow index and wherein at least one of said fluoropolymers has an LCBI of at least 0.2 and a zero shear rate viscosity at 265° C. of not more than $10^7$ Pa's. Such composition can be used not only to improve the processing of non-fluorinated polymers but may also improve the processing of fluoropolymers, in particular the extrusion of fluoropolymers.

By the term "non-fluorinated" is meant that the polymer is free of fluorine atoms or contains fluorine atoms in a ratio of fluorine atoms to carbon atoms of less than 1:1. By the term "melt-processible" is meant that the polymer can be processed in commonly used melt-processing equipment such as for example an extruder. For example, when the non-fluorinated polymer is polyethylene, it should typically have a melt index of 5 g/10 minutes or less, preferably 2 g/10 minutes or less (measured according to ASTM D1238 at 190° C., using a 2160 g weight).

By the term "fluoropolymer" is meant a polymer that has a fluorinated backbone and in which the ratio of fluorine atoms to carbon atoms is at least 1:1, preferably at least 1:1.5. The fluoropolymer may thus be partially fluorinated on the backbone or may have a fully fluorinated backbone, i.e. a perfluoropolymer.

The term "melt-processible polymer composition" includes compositions which can be used as an additive or processing aid, i.e. the composition is to be mixed with further melt-processible non-fluorinated polymer and/or further components to obtain a composition ready for processing into a polymer article as well as polymer composition that are ready for being extruded into a polymer article.

4. DETAILED DESCRIPTION OF THE INVENTION

The fluoropolymers for use in the melt-processible polymer composition are non-linear polymers i.e. branched polymers. The level of branching or non-linearity can be characterized through the long chain branching index (LCBI). The LCBI can be determined as described in R. N. Shroff, H. Mavridis; *Macromol.*, 32, 8464-8464 (1999) & 34, 7362-7367 (2001) according to the equation:

$$LCBI = \frac{\eta_{0,br.}^{1/a}}{[\eta]_{br.}} \cdot \frac{1}{k^{1/a}} - 1 \qquad \text{eq. 1}$$

In the above equation, $\eta_{0,br}$ is the zero shear viscosity (units Pa's) of the branched fluoropolymer measured at a temperature T and $[\eta]_{br}$ is the intrinsic viscosity (units ml/g) of the branched fluoropolymer at a temperature T' in a solvent in which the branched fluoropolymer can be dissolved and a and k are constants. These constants are determined from the following equation:

$$\eta_{0,lin} = k \cdot [\eta]_{lin.}^a \qquad \text{eq. 2}$$

wherein $\eta_{0,lin}$ and $[\eta]_{lin}$ represent respectively the zero shear viscosity and intrinsic viscosity of the corresponding linear fluoropolymer measured at the respective same temperatures T and T' and in the same solvent. Thus, the LCBI is independent of the selection of the measurement temperatures and solvent chosen provided of course that the same solvent and temperatures are used in equations 1 and 2. The zero shear viscosity and intrinsic viscosity are typically determined on freeze coagulated fluoropolymers.

The values a and k along with the test conditions for some of the fluoropolymers that may be used in the melt-processible polymer composition are set forth in the following table:

| Polymer | test condition | a-value | k-value |
|---|---|---|---|
| $TFE_{39}/HFP_{11}/VDF_{50}$ | A | 5.8 | $2.4\ 10^{-8}$ |
| $TFE_{24.5}/HFP_{23}/VDF_{52.5}$ | A | 5.8 | $5.5\ 10^{-8}$ |
| $VDF_{78}/HFP_{22}$ | A | 5.8 | $1.5\ 10^{-8}$ |
| polyvinylidene fluoride | B | 5.8 | $1.2\ 10^{-8}$ |
| polyvinylidene fluoride | C | 5.8 | $2.2\ 10^{-8}$ |

In the above table, the indexes to the monomer units in the polymer indicate the amount of the respective unit in mole % and the test conditions are as follows:

A: shear viscosity at 265° C. and the intrinsic viscosity in methyl ethyl ketone at 35° C.

B: shear viscosity at 230° C. and the intrinsic viscosity in dimethylformamide at 23° C.

C: shear viscosity at 230° C. and the intrinsic viscosity in dimethylformamide at 110° C.

It can be observed from the above table that the constant a appears to be independent of the fluoropolymer tested whereas the k-value varies with composition of the fluoropolymer and test condition used.

The LCBI of the fluoropolymer used should have a value of at least 0.2. Generally, the effectiveness of the fluoropolymer to decrease melt defects will increase with increasing value of the LCBI for polymers having similar zero shear rate viscosities ($\eta_0$). However, when the level of branching (and thus the LCBI value) becomes too large, the fluoropolymer may have a gel fraction that cannot be dissolved in an organic solvent. At such high levels of branching, the advantageous effects of the fluoropolymer on the processing of the melt-processable polymer composition are reduced as the melt viscosity of the fluoropolymer is too high. One skilled in the art through routine experimentation may readily determine the appropriate value of LCBI. Generally, the LCBI will be between 0.2 and 5, preferably between 0.5 and 1.5.

The fluoropolymers for use in the melt-processable polymer composition may be amorphous, i.e. they have no melting point or hardly show a melting point or they can be semicrystalline fluoropolymers, i.e. polymers that have a clearly detectable melting point. Generally, the fluoropolymers are incompatible with the melt-processable non-fluorinated polymer (hereinafter also host polymer) and should possess a zero shear rate viscosity $\eta_0$ of not more than $10^7$ Pa's at 265° C. Preferably, $\eta_0$ (265° C.) is between $10^3$ Pa's and $5 \cdot 10^6$ Pa's, more preferably between $10^4$ and $10^6$ Pa's. Although the zero shear rate viscosity is indicated as the viscosity at 265° C., this does not require that $\eta_0$ necessarily be measured at 265° C. For example, for particular polymers it may be more suitable or necessary to measure $\eta_0$ at a lower or higher temperature. Nevertheless, the $\eta_0$ determined at a lower or higher temperature can be converted or calculated to the value at 265° C. through the use of the Arrhenius equation as described in for example by M. Pahl, W. GleiBle, H. Laun: "Praktischer Rheologie der Kunststoffe und Elastomere", VDI Verlag Düsseldorf.

Fluoropolymers for use in this invention include fluoropolymers that comprise interpolymerized units derived from at least one fluorinated, ethylenically unsaturated monomer, preferably two or more monomers, of the formula

$$RCF=CR_2 \quad (I)$$

wherein each R is independently selected from H, F, Cl, alkyl of from 1 to 8 carbon atoms, aryl of from 1 to 8 carbon atoms, cyclic alkyl of from 1 to 10 carbon atoms, or perfluoroalkyl of from 1 to 8 carbon atoms. The R group preferably contains from 1 to 3 carbon atoms. In this monomer each R group may be the same as each of the other R groups. Alternatively, each R group may be different from one or more of the other R groups.

The fluoropolymer may also comprise a copolymer derived from the interpolymerization of at least one formula I monomer with at least one nonfluorinated, copolymerizable comonomer having the formula:

$$R^1_2C=CR^1_2 \quad (II)$$

wherein $R^1$ is selected from H, Cl, or an alkyl group of from 1 to 8 carbon atoms, a cyclic alkyl group of from 1 to 10 carbon atoms, or an aryl group of from 1 to 8 carbon atoms. $R^1$ preferably contains from 1 to 3 carbon atoms.

Representative examples of useful fluorinated formula I monomers include, but are not limited to, vinylidene fluoride, tetrafluoroethylene, hexafluoropropylene, chlorotrifluoroethylene, 2-chloropentafluoropropene, dichlorodifluoroethylene, 1,1-dichlorofluoroethylene, and mixtures thereof. Perfluoro-1,3-dioxoles may also be used. The perfluoro-1,3-dioxole monomers and their copolymers are described in U.S. Pat. No. 4,558,141 (Squires).

Representative examples of useful formula II monomers include ethylene, propylene, etc.

Particular examples of fluoropolymers include polyvinylidene fluoride, fluoropolymers derived from the interpolymerization of two or more different formula I monomers and fluoropolymers derived from one or more formula I monomers with one or more formula II monomers. Examples of such polymers are those having interpolymerized units derived from vinylidene fluoride (VDF) and hexafluoropropylene (HFP); and those derived from tetrafluoroethylene (TFE) and at least 5 weight % of at least one copolymerizable comonomer other than TFE. This latter class of fluoropolymers includes polymers of interpolymerized units derived from TFE and HFP; polymers of interpolymerized units derived from TFE, HFP and VDF; polymers of interpolymerized units derived from TFE, HFP and a formula II monomer; and polymers derived from interpolymerized units derived from TFE and a formula II monomer.

A desired level of branching of the fluoropolymers may be obtained in a variety of ways. For example, in one embodiment, branching of the fluoropolymer may be obtained through the polymerization process to make the fluoropolymer. Thus a branched fluoropolymer may be derived from the copolymerization of one or more fluorinated monomers and optional non-fluorinated co-monomers with a modifier that causes long chain branches to be formed during polymerization. Such modifiers are typically monomers that may be fluorinated or not and that include a halogen atom that is readily abstracted during the polymerization, e.g. bromine or iodine, such that a radical is formed on the polymer backbone which may then participate in further polymerization thereby forming a long chain branch. Suitable modifiers include for example fluorinated or non-fluorinated olefins that have one or more bromine and/or iodine atoms.

Examples of olefins that may be used as a modifier to obtain a branched fluoropolymer include olefins corresponding to the general formula:

$$X_2C=CXZ \quad (III)$$

wherein each X may be the same or different and is selected from the group consisting of hydrogen, F, Cl, Br and I, with the proviso that at least one X represents Br or I, Z represents hydrogen, F, Cl, Br, I, a perfluoroalkyl group, a perfluoroalkoxy group or a perfluoropolyether group. Examples of perfluoroalkyl groups include linear or branched perfluoroalkyl groups having between 1 and 8 carbon atoms, for example 1 to 5 carbon atoms. Examples of perfluoroalkoxy groups include those that have between 1 and 8 carbon atoms, for example between 1 and 5 carbon atoms in the alkyl group and whereby the alkyl group may be linear or branched. Examples of perfluoropolyether groups include those corresponding to the formula:

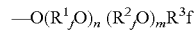

$$-O(R^1_fO)_n(R^2_fO)_mR^3_f$$

wherein $R^1_f$ and $R^2_f$ are each linear or branched perfluoroalkylene groups of 1-6 carbon atoms, in particular 2 to 6 carbon atoms, m and n are independently 0-10 with m+n being at least 1 and $R^3f$ is a perfluoroalkyl group of 1-6 carbon atoms.

A subclass of olefins of formula (III) that may be employed includes those wherein X is selected from hydrogen, F and Br with the proviso that at least one X represents Br and Z is hydrogen, F, Br, a perfluoroalkyl group or a perfluoroalkoxy group. Specific examples of olefins that may conveniently be used include 1-bromo-1,2,2,-trifluoroethylene, bromotrifluoroethylene (referred as BTFE), vinylbromide, 1,1-dibromoethylene, 1,2-dibromoethylene and 1-bromo-2,3,3,3-tetrafluoro-propene. Generally preferred is 1-bromo-2,2-difluoroethylene (BDFE). It is of course also possible to use a mixture of the bromine or iodine containing olefins.

Still further modifiers that may be used include those corresponding to the formula:

$$X^a{}_2C=CX^a-R_f-(X^b)_r \qquad (IV)$$

wherein each $X^a$ independently represents hydrogen, fluorine, bromine, chlorine or iodine; $R_f$ is a perfluoroalkylene group, typically having 1 to 8 carbon atoms, a perfluorooxyalkylene group or a perfluoropolyether group, $X^b$ represents a halogen selected from bromine, iodine and mixtures thereof and r is 1, 2 or 3. The halogens $X^b$ may be contained in terminal position of the $R_f$ group but can alternatively also be contained along the chain of the $R_f$ group. Examples of olefins according to formula (IV) include:

$CH_2=CH-CF_2-Br$ $CF_2=CF-CF_2-CFBr-CF_3$ $CF_2=CF-(CF_2)_3-CF_2Br$ $CH_2=CH-O-(CF_2)-CF_2Br$ $CF_2=CF-O-CF_2-CF_2-O-CF_2CF_2CF_2Br$ $CH_2=CH-CF_2CF_2-I$

The aforementioned modifiers should generally be used at fairly low levels to avoid too extensive branching to occur during the polymerization. The amount of modifier that is typically used in the polymerization to cause a desired amount of branching of the fluoropolymer depends on the nature of the modifier used and on the polymerization conditions such as e.g. reaction time and temperature. The amount of modifier to be used is selected such that the desired LCBI value is attained. The optimal amount of modifier can be readily determined by one skilled in the art but is generally not more than 1% by weight and for example not more than 0.7% or 0.5% by weight based on the total weight of monomers fed to the polymerization. A useful amount may be from 0.01% to 1% by weight, conveniently 0.05 to 0.5% by weight, alternatively 0.01 to 0.3% by weight or from 0.05% to 0.25% by weight. The modifier can be added at the start of the polymerization and/or may be added during the polymerization in a continuous way and/or portion-wise. Preferably, the modifier is continuously fed to the polymerization.

Alternatively, to cause branching of the fluoropolymer during polymerization, a bifunctional comonomer can be used, i.e. a comonomer that has 2 polymerizable groups in the molecule. Examples of such comonomers include bisolefins including fluorinated bisolefins as disclosed in U.S. Pat. No. 5,585,449. However, when including such bifunctional monomers in the polymerization of the fluoropolymer, care should be taken to avoid that substantial cross-linking would occur during the polymerization.

The fluoropolymers for use as processing aids can be obtained with any of the known polymerization techniques including solution polymerization, suspension polymerization and polymerization in super critical $CO_2$. The fluoropolymers are preferably made through an aqueous emulsion polymerization process, which can be conducted in a known manner including batch, semi-batch or continuous polymerization techniques. The reactor vessel for use in the aqueous emulsion polymerization process is typically a pressurizable vessel capable of withstanding the internal pressures during the polymerization reaction. Typically, the reaction vessel will include a mechanical agitator, which will produce thorough mixing of the reactor contents and heat exchange system. Any quantity of the fluoromonomer(s) may be charged to the reactor vessel. The monomers may be charged batchwise or in a continuous or semicontinuous manner. By semi-continuous is meant that a plurality of batches of the monomer are charged to the vessel during the course of the polymerization. The independent rate at which the monomers are added to the kettle will depend on the consumption rate of the particular monomer with time. Preferably, the rate of addition of monomer will equal the rate of consumption of monomer, i.e. conversion of monomer into polymer.

The reaction kettle is charged with water, the amounts of which are not critical. To the aqueous phase there is generally also added a fluorinated surfactant, typically a non-telogenic fluorinated surfactant although aqueous emulsion polymerization without the addition of fluorinated surfactant may also be practiced. When used, the fluorinated surfactant is typically used in amount of 0.01% by weight to 1% by weight. Suitable fluorinated surfactants include any fluorinated surfactant commonly employed in aqueous emulsion polymerization. Particularly preferred fluorinated surfactants are those that correspond to the general formula:

$$Y-R_f-Z-M$$

wherein Y represents hydrogen, Cl or F; $R_f$ represents a linear or branched perfluorinated alkylene having 4 to 10 carbon atoms; Z represents $COO^-$ or $SO_3^-$ and M represents an alkali metal ion or an ammonium ion. Most preferred fluorinated surfactants for use in this invention are the ammonium salts of perfluorooctanoic acid and perfluorooctane sulphonic acid. Mixtures of fluorinated surfactants can be used.

A chain transfer agent may be used to control the molecular weight of the fluoropolymer so as to obtain the desired zero shear rate viscosity. Useful chain transfer agents include $C_2$-$C_6$ hydrocarbons such as ethane, alcohols, ethers, esters including aliphatic carboxylic acid esters and malonic esters, ketones and halocarbons. Particularly useful chain transfer agents are dialkylethers such as dimethyl ether and methyl tertiary butyl ether.

The polymerization is usually initiated after an initial charge of monomer by adding an initiator or initiator system to the aqueous phase. For example peroxides can be used as free radical initiators. Specific examples of peroxide initiators include, hydrogen peroxide, diacylperoxides such as diacetylperoxide, dipropionylperoxide, dibutyrylperoxide, dibenzoylperoxide, benzoylacetylperoxide, diglutaric acid peroxide and dilaurylperoxide, and further water soluble per-acids and water soluble salts thereof such as e.g. ammonium, sodium or potassium salts. Examples of per-acids include peracetic acid. Esters of the peracid can be used as well and examples thereof include tert.-butylperoxyacetate and tert.-butylperoxypivalate. A further class of initiators that can be used are water soluble azo-compounds. Suitable redox systems for use as initiators include for example a combination of peroxodisulphate and hydrogen sulphite or disulphite, a combination of thiosulphate and peroxodisulphate or a combination of peroxodisulphate and hydrazine. Further initiators that can be used are ammonium-alkali- or earth alkali salts of persulfates, permanganic or manganic acid or manganic acids. The amount of initiator employed is typically between 0.03 and 2% by weight, preferably between 0.05 and 1% by weight based on the total weight of the polymerization mixture. The full amount of initiator may be added at the start of the polymerization or the initiator can be added to the polymerization in a continuous way during the polymerization until a conversion of 70 to 80%. One can also add part of the initiator at the start and the remainder in one or separate additional portions during the polymerization. Accelerators such as for example water-soluble salts of iron, copper and silver may preferably also be added.

During the initiation of the polymerization reaction, the sealed reactor kettle and its contents are conveniently preheated to the reaction temperature. Polymerization temperatures are from 20° C. to 150° C., preferred from 30° C. to 110° C. and most preferred from 40° C. to 100° C. The polymerization pressure is typically between 4 and 30 bar, in particular 8 to 20 bar. The aqueous emulsion polymerization system may further comprise auxiliaries, such as buffers and complex-formers.

The amount of polymer solids that can be obtained at the end of the polymerization is typically between 10% and 45% by weight, preferably between 20% and 40% by weight and the average particle size of the resulting fluoropolymer is typically between 50 nm and 500 nm.

In a yet further embodiment, branching of the fluoropolymer may be accomplished by grafting branches onto the fluoropolymer. For example, when the fluoropolymer is capable of being dehydrofluorinated when exposed to a dehydrofluorinating agent, such as is for example the case for polymers derived from VDF and optional comonomers, the fluoropolymer may be dehydrofluorinated thereby forming double bonds in the fluoropolymer backbone. These can then be used in a subsequent or simultaneous reaction to cause branching of the fluoropolymer.

Examples of materials useful as dehydrofluorinating agents include strong bases, such as 1,8 diaza[5.4.0]bicyclo undec-7-ene, (DBU) and 1,5-diazabicyclo[4.3.0]-5-nonene, (DBN). Organo-onium compounds known for use in the curing of fluoroelastomers on the basis of a polyhydroxy cure reaction may also be used as a dehydrofluorinating agent. Examples of organo-onium compounds include those that contain at least one heteroatom, i.e., a non-carbon atom such as N, P, S, O, bonded to organic or inorganic moieties and include for example ammonium salts, phosphonium salts and iminium salts. One class of quaternary organo-onium compounds useful in the present invention broadly comprises relatively positive and relatively negative ions wherein a phosphorus, arsenic, antimony or nitrogen generally comprises the central atom of the positive ion, and the negative ion may be an organic or inorganic anion (e.g., halide, sulfate, acetate, phosphate, phosphonate, hydroxide, alkoxide, phenoxide, bisphenoxide, etc.).

Examples of useful organo-onium compounds are described and known in the art. See, for example, U.S. Pat. No. 4,233,421 (Worm), U.S. Pat. No. 4,912,171 (Grootaert et al.), U.S. Pat. No. 5,086,123 (Guenthner et al.), and U.S. Pat. No. 5,262,490 (Kolb et al.), U.S. Pat. No. 5,929,169, all of whose descriptions are herein incorporated by reference. Representative examples include the following individually listed compounds and mixtures thereof:
triphenylbenzyl phosphonium chloride
tributylallyl phosphonium chloride
tributylbenzyl ammonium chloride
tetrabutyl ammonium bromide
triaryl sulfonium chloride
8-benzyl-1,8-diazabicyclo [5,4,0]-7-undecenium chloride
benzyl tris(dimethylamino)phosphonium chloride
benzyl(diethylamino)diphenylphosphonium chloride.

Another class of useful organo-onium compounds include those having one or more pendent fluorinated alkyl groups. Generally, the most useful fluorinated onium compounds are disclosed by Coggio et al. in U.S. Pat. No. 5,591,804. Combinations of dehydrofluorinating, agents may be employed if desired.

As mentioned above, upon dehydrofluorination, a double bond forms along the backbone of the fluoropolymer which may subsequently or simultaneously be reacted to cause branching of the fluoropolymer. Generally, the reaction between the double bonds of different fluoropolymer chains may readily occur in the presence of oxygen at elevated temperature or the double bonds may be caused to react by irradiation with light, e.g. UV-light. Alternatively, a free radical generating compound may be used to cause reaction of the double bonds. For example, a peroxide may be used to cause the double bonds to react. Suitable organic peroxides are those which generate free radicals at elevated temperatures. A dialkyl peroxide or a bis(dialkyl peroxide) which decomposes at a temperature above 50° C. may for example be used. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from such compounds as dicumyl peroxide, dibenzoyl peroxide, tertiarybutyl perbenzoate, α,α'-bis(t-butylperoxy-diisopropylbenzene), and di[1,3-dimethyl-3-(t-butylperoxy)-butyl]carbonate.

The dehydrofluorination reaction and/or reaction of the double bonds formed should typically be controlled such that only a limited amount of reaction between the fluoropolymer chains occur. When a too large amount of double bonds are formed and reacted, a cross-linked polymer may result that has a too high zero shear rate viscosity ($\eta_o$).

In a further embodiment to cause reaction between the double bonds, dehydrofluorination may be carried out in the presence of a polyhydroxy compound. As is known in the art of fluoroelastomers, upon dehydrofluorination in the presence of a polyhydroxy compound, reaction between the fluoropolymer chains is caused, thereby causing cross-linking of the fluoropolymer to a fluoroelastomer.

The polyhydroxy compound may be any of those polyhydroxy compounds known in the art to function as a crosslinking agent or co-curative for fluoroelastomers, such as those polyhydroxy compounds disclosed in U.S. Pat. No. 3,876,654 (Pattison), and U.S. Pat. No. 4,233,421 (Worm). Representative aromatic polyhydroxy compounds include any one of the following: di-, tri-, and tetrahydroxybenzenes, naphthalenes, and anthracenes, and bisphenols. A commonly employed aromatic polyphenols 4,4'-hexafluoroisopropylidenyl bisphenol, known more commonly as bisphenol AF. The compounds 4,4'-dihydroxydiphenyl sulfone (also known as Bisphenol S) and 4,4'-isopropylidenyl bisphenol (also known as bisphenol A) can also be used.

In a particular embodiment of the present invention, the melt-processible polymer composition comprises a blend of at least two fluoropolymers that differ in their melt flow index and wherein at least one of the fluoropolymers has an LCBI of at least 0.2 and a zero shear rate viscosity of not more than $10^7$ Pa's at 265° C. Thus, in a particular embodiment of this invention, a blend of fluoropolymers may be used in which one fluoropolymer component has a melt flow index ($MFI_A$) and wherein a second fluoropolymer component has a melt flow index ($MFI_B$) whereby $MFI_A$ is greater than $MFI_B$, i.e. component A will have a higher molecular weight as component B. Generally, the ratio of $MFI_A$:$MFI_B$ should be at least 2:1, typically from 5:1 to $10^6$:1. The weight ratio of component A to component B may vary widely and can be between 1:99 and 99:1.

In an other embodiment, the melt-processible polymer composition may comprise a blend of one or more fluoropolymers having an LCBI of at least 0.2 and a zero shear rate viscosity of not more than $10^7$ Pa's at 265° C. with one or more fluoropolymers that are essentially linear, i.e. that have an LCBI of less than 0.2, for example less than 0.1. When the branched fluoropolymer is blended with a linear fluoropolymer, the amount of the latter should generally be between 10 and 50% by weight.

The amount of fluoropolymer in the melt-processible polymer composition is typically relatively low. The exact amount used may be varied depending upon whether the melt-processible composition is to be extruded into its final form (e.g., a film) or whether it is to be used as a masterbatch or processing additive which is to be further diluted with additional host polymer before being extruded into its final form. Generally, the fluoropolymer comprises from about 0.005 to 50 weight percent of the melt processable polymer composition. If the melt processable polymer composition is a masterbatch or processing additive, the amount of fluoropolymer may vary between about 2 to 50 weight percent of the composition. If the melt processable polymer composition is to be extruded into final form and is not further diluted by the addition of host polymer, it typically contains a lower concentration of fluoropolymer, e.g., about 0.005 to 2 weight percent, and preferably about 0.01 and 0.2 weight percent of the melt-processable composition. In any event, the upper concentration of fluoropolymer used is generally determined by economic limitations rather than by any adverse physical effect of the concentration of the fluoropolymer.

A wide variety of polymers are useful as the host polymer in the present invention. Useful host polymers are non-fluorinated polymers that are sometimes referred to as being difficultly melt processable. They include both hydrocarbon and non-hydrocarbon polymers. Examples of useful host polymers include, but are not limited to, polyamides, chlorinated polyethylene, polyimides, polyurethanes, polyolefins, polystyrenes, polyesters, polycarbonates, polyketones, polyureas, polyvinyl resins such as polyvinyl choride, polyacrylates and polymethylacrylates.

A particularly useful class of host polymers are polyolefins. Representative examples of polyolefins useful in the present invention are polyethylene, polypropylene, poly(1-butene), poly(3-methylbutene), poly(4-methylpentene) and copolymers of ethylene with propylene, 1-butene, 1-hexene, 1-octene, 1-decene, 4-methyl-1-pentene, and 1-octadecene.

Representative blends of polyolefins useful in the invention are blends of polyethylene and polypropylene, linear or branched low-density polyethylenes, high-density polyethylenes, and polyethylene and olefin copolymers containing said copolymerizable monomers, some of which are described below, e.g., ethylene and acrylic acid copolymers; ethylene and methyl acrylate copolymers; ethylene and ethyl acrylate copolymers; ethylene and vinyl acetate copolymers; ethylene, acrylic acid, and ethyl acrylate copolymers; and ethylene, acrylic acid, and vinyl acetate copolymers.

The polyolefins may be obtained by the homopolymerization or copolymerization of olefins, as well as copolymers of one or more olefins and up to about 30 weight percent or more, but preferably 20 weight percent or less, of one or more monomers that are copolymerizable with such olefins, e.g. vinyl ester compounds such as vinyl acetate. The olefins may be characterized by the general structure $CH_2$=CHR, wherein R is a hydrogen or an alkyl radical, and generally, the alkyl radical contains not more than 10 carbon atoms, preferably from one to six carbon atoms. Representative olefins are ethylene, propylene, 1-butene, 1-hexene, 4-methyl-1-pentene, and 1-octene. Representative monomers that are copolymerizable with the olefins include: vinyl ester monomers such as vinyl acetate, vinyl propionate, vinyl butyrate, vinyl chloroacetate, and vinyl chloropropionate; acrylic and alpha-alkyl acrylic acid monomers and their alkyl esters, amides, and nitriles such as acrylic acid, methacrylic acid, ethacrylic acid, methyl acrylate, ethyl acrylate, N,N-dimethyl acrylamide, methacrylamide, and acrylonitrile; vinyl aryl monomers such as styrene, o-methoxystyrene, p-methoxystyrene, and vinyl naphthalene; vinyl and vinylidene halidemonomers such as vinyl chloride, vinylidene chloride, and vinylidene bromide; alkyl ester monomers of maleic and fumaric acid and anhydrides thereof such as dimethyl maleate, diethyl maleate, and maleic anhydride; vinyl alkyl ether monomers such as vinyl methyl ether, vinyl ethyl ether, vinyl isobutyl ether, and 2-chloroethyl vinyl ether; vinyl pyridine monomers; N-vinyl carbazole monomers; and N-vinyl pyrolidine monomers.

Useful host polymers also include the metallic salts of the olefin copolymers, or blends thereof, that contain free carboxylic acid groups. Illustrative of the metals that can be used to provide the salts of said carboxylic acids polymers are the one, two, and three valence metals such as sodium, lithium, potassium, calcium, magnesium, aluminum, barium, zinc, zirconium, beryllium, iron, nickel, and cobalt.

Useful host polymers also include blends of various thermoplastic polymers and blends thereof containing conventional adjuvants such as antioxidants, light stabilizers, fillers, antiblocking agents, and pigments.

The host polymers may be used in the form of powders, pellets, granules, or in any other extrudable form. The most preferred olefin polymers useful in the invention are hydrocarbon polymers such as homopolymers of ethylene and propylene or copolymers of ethylene and 1-butene, 1-hexene, 1-octene, 4-methyl-1-pentene, propylene, vinyl acetate and methyl acrylate. The melt processable composition of the invention can be prepared by any of a variety of ways. For example, the host polymer and the fluoropolymer can be combined together by any of the blending means usually employed in the plastics industry, such as with a compounding mill, a Banbury mixer, or a mixing extruder in which the fluoropolymer is uniformly distributed throughout the host polymer. The fluoropolymer and the host polymer may be used in the form, for example, of a powder, a pellet, or a granular product. The mixing operation is most conveniently carried out at a temperature above the melting point or softening point of the fluoropolymer, though it is also feasible to dry-blend the components in the solid state as particulates and then cause uniform distribution of the components by feeding the dry blend to a twin-screw melt extruder.

The resulting melt-blended mixture can be pelletized or otherwise comminuted into a desired particulate size or size distribution and fed to an extruder, which typically will be a single-screw extruder, that melt-processes the blended mixture. Melt-processing typically is performed at a temperature from 180° C. to 280° C., although optimum operating temperatures are selected depending upon the melting point, melt viscosity, and thermal stability of the blend. Different types of extruders that may be used to extrude the compositions of this invention are described, for example, by Rauwendaal, C., "Polymer Extrusion," Hansen Publishers, p. 23-48, 1986. The die design of an extruder can vary, depending on the desired extrudate to be fabricated. For example, an annular die can be used to extrude tubing, useful in making fuel line hose, such as that described in U.S. Pat. No. 5,284,184 (Noone et al.), which description is incorporated herein by reference.

The blended composition can contain conventional adjuvants such as antioxidants, antiblocks, pigments, and fillers, e.g. titanium dioxide, carbon black, and silica. Antiblocks, when used, may be coated or uncoated materials.

The fluoropolymer may also be combined with a poly (oxyalkylene) polymer component as a so-called synergist. By 'synergist' is meant a compound, generally non-fluorinated organic compound, that allows the use of a lower amount of the fluoropolymer while achieving essentially the same improvement in extrusion and processing properties of the non-fluorinated polymer as if a higher amount of the fluoropolymer was used. The poly(oxyalkylene) polymer component may comprise one or more poly(oxyalkylene) polymers. A useful processing additive composition comprises between about 5 and 95 weight percent of the poly (oxyalkylene) polymer component and 95 and 5 weight percent of the fluoropolymer. Typically, the ratio of the fluoropolymer to the poly(oxyalkylene) polymer component in the processing aid will be from 1/2 to 2/1.

The poly(oxyalkylene) polymer component generally may comprise between about 0.005 and 20 weight percent of the overall melt processable composition, more preferably between about 0.01 and 5 weight percent, and most preferably between about 0.02 and 1 weight percent. Generally, poly(oxyalkylene) polymers useful in this invention include poly(oxyalkylene) polyols and their derivatives. A class of such poly(oxyalkylene) polymers may be represented by the general formula:

$$A[(OR^3)_xOR^2]_y$$

wherein:

A is an active hydrogen-free residue of a low molecular weight, initiator organic compound having a plurality of active hydrogen atoms (e.g., 2 or 3), such as a polyhydroxyalkane or a polyether polyol, e.g., ethylene glycol, glycerol, 1,1,1-trimethylol propane, and poly(oxypropylene) glycol;

y is 2 or 3;

$(OR^3)_x$ is a poly(oxyalkylene) chain having a plurality of oxyalkylene groups, $OR^3$ wherein the $R^3$ moieties can be the same or different and are selected from the group consisting of $C_1$ to $C_5$ alkylene radicals and, preferably, 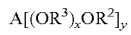 or $C_3$ alkylene radicals, and x is the number of oxyalkylene units in said chain. Said poly(oxyalkylene) chain can be a homopolymer chain, e.g., poly(oxyethylene) or poly(oxypropylene), or can be a chain of randomly distributed (i.e., a heteric mixture) oxyalkylene groups, e.g., a copolymer —$OC_2H_4$— and —$OC_3H_6$— units, or can be a chain having alternating blocks or backbone segments of repeating oxyalkylene groups, e.g., a polymer comprising (—$OC_2H_4$—)$_a$ and (—$OC_3H_6$—)$_b$ blocks, wherein a+b=5 to 5000 or higher, and preferably 10 to 500.

$R^2$ is H or an organic radical, such as alkyl, aryl, or a combination thereof such as aralkyl or alkaryl, and may contain oxygen or nitrogen heteroatoms. For example, $R^2$ can be methyl, butyl, phenyl, benzyl, and acyl groups such as acetyl, benzoyl and stearyl.

Representative poly(oxyalkylene) polymer derivatives can include poly(oxyalkylene) polyol derivatives wherein the terminal hydroxy groups have been partly or fully converted to ether derivatives, e.g., methoxy groups, or ester derivatives, e.g., stearate groups. Other useful poly(oxyalkylene) derivatives are polyesters, e.g., prepared from dicarboxylic acids and poly(oxyalkylene) glycols. Preferably, the major proportion of the poly(oxyalkylene) polymer derivative by weight will be the repeating oxyalkylene groups, ($OR^3$).

The poly(oxyalkylene) polyols and their derivatives can be those which are solid at room temperature and have a molecular weight of at least about 200 and preferably a molecular weight of about 400 to 20,000 or higher. Poly (oxyalkylene) polyols useful in this invention include polyethylene glycols which can be represented by the formula $H(OC_2H_4)_nOH$, where n is about 15 to 3000, such as those sold under the Carbowax trademark, such as Carbowax™ PEG 8000, where n is about 181, and those sold under the trade name Polyox, such as Polyox™ WSR N-10 where n is about 2272.

As an alternative to or in combination with a poly (alkyleneoxy) polymer, there can also be used any of the following polymers as synergists: i) silicone-polyether copolymers; ii) aliphatic polyesters such as poly(butylene adipate), poly(lactic acid) and polycaprolactone polyesters and iii) aromatic polyesters such as phthalic acid diisobutyl ester.

The melt-processible polymer composition is useful in the extrusion of melt-processible non-fluorinated polymers, which includes for example, extrusion of films, extrusion blow molding, injection molding, pipe, wire and cable extrusion, and fiber production.

The following examples are offered to aid in a better understanding of the present invention. These examples are not to be construed as an exhaustive compilation of all embodiments of the present invention and are not to be unnecessarily construed as limiting the scope of this invention.

EXAMPLES

Test Methods

The melt flow index (MFI) was carried out according to DIN 53735, ISO 12086 or ASTM D-1238 at a support weight of 5.0 kg and a temperature of 265° C. The MFIs cited here were obtained with a standardized extrusion die of 2.1 mm diameter and a length of 8.0 mm.

Solution viscosities of diluted polymer solutions were determined usually on a 0.16% polymer solution in methylethylketone (MEK) at 35° C. in accordance with DIN 53726. A Connon-Fenske-Routine-Viskosimeter (Fa. Schott, Mainz/Germany) fulfilling ISO/DIS 3105 and ASTM D 2515 was used for the measurements, the Hagenbach correction was applied. The so-obtained reduced viscosities $\eta_{red.}$ were converted into the intrinsic viscosity $[\eta]$ using the Huggins equation $(\eta_{red.}=[\eta]+k_H\times[\eta]^2\times c)$ and a Huggins constant of $k_H$=0.34. The intrinsic viscosity $[\eta]$ as well as the reduced viscosity $\eta_{red.}$ are reported in physical units of ml/g.

A strain controlled ARES rheometer of Rheometry Scientific or AR 2000 rheometer from TA Instruments Ltd., was used to record the dynamic mechanical data of the fluoropolymer in frequency sweep experiments. For the various frequency sweeps at the specific temperature in nitrogen atmosphere, a 25 mm parallel plate geometry was used and a strain typically ranging from 1 to 20% was applied. The individual frequency sweeps (at constant temperature) were superimposed to one master curve using the time-temperature-shift (TTS) tool of the Orchestrator or Rheology Advantage Data Analysis (TA Instruments Ltd) software, 265° C. was used as reference temperature. Zero shear viscosities $\eta_0$, reported in Pa·s, were extrapolated using the 4 parameters Carreau fit function of the Orchestrator or Sigmaplot 2000 software.

The latex particle size determination was conducted by means of dynamic light scattering with a Malvern Zetazizer 1000 HSA in accordance to ISO/DIS 13321. Prior to the measurements, the polymer latexes as yielded from the polymerizations were diluted with 0.001 mol/L KCl-solution, the measurement temperature was 20° C. in all cases.

$^{19}F$ nuclear magnetic resonance (NMR) spectra were recorded with a Bruker Avance 400 (400.13 MHz) instrument, 3000 scans per measurement were usually applied.

The LCBI values were calculated according to equation 1 described above, using the values of the zero shear rate viscosity ($\eta_0$) and intrinsic viscosity ([$\eta$]) that were determined according to the above described methods for the fluoropolymers on freeze coagulated fluoropolymers. The value of 5.8 was used as the a constant in equation 1 for all the fluoropolymer. The value of $1.5 \cdot 10^{-8}$ was used as the k constant of equation 1 for the polymers LCB FC-1 to LCB FC-6, $5.5 \cdot 10^{-8}$ was used for LCB FC-7 to FC-8 and $2.4 \cdot 10^{-8}$ was used for the polymers LCB FC-9 to LCB FC-11.

Preparation of the Fluoropolymers

Synthesis of LCB Fluoropolymers (LCB FC-1 to LCB FC-6)

Long chain branched fluoropolymers LCB FC-1 to LCB FC-6 were made essentially according to the procedure below, which exemplifies the synthesis of LCB FC-1:
A polymerization kettle with a total volume of 48.5 l (including feeding pipes) equipped with an impeller agitator system was charged with 29.0 l deionized water. The oxygen free kettle was then heated up to 70° C. and the agitation system was set to 240 rpm. The kettle was charged with 6.0 g dimethylether (Me$_2$O) and 980 g hexafluoropropylene (HFP) to a pressure of 8.0 bar absolute and with 435 g vinylidenefluoride (VDF) to 15.5 bar absolute reaction pressure. In the following, a stainless steel cylinder with a total volume of 5.3 l used as feeding line for HFP was fully evacuated. After complete evacuation, the cylinder was charged with 450 mbar of BDFE, which corresponds to 14 g at room temperature according to the ideal gas law. Then the cylinder was rapidly charged with 5310 g HFP in order to ensure a sufficient dispersion of BDFE into HFP under turbulent flow conditions.

The polymerization was initiated by the addition of 40 g aqueous ammonium peroxodisulfate (APS) dissolved into 120 ml water. As the reaction starts, the reaction temperature was maintained and the reaction pressure of 15.5 bar absolute was maintained by the feeding of VDF and HFP into the gas phase with a feeding ratio HFP (kg)/VDF (kg) of 0.653. When a total feed of 8125 g VDF was reached in 241 min, the feed of the monomers was interrupted by closing the monomer valves. Within 10 minutes, the monomer gas phase was reacted down to a kettle pressure of 8.2 bar. Then the reactor was vented and flushed with N$_2$ in three cycles.

The so-obtained 42.4 kg polymer dispersion with a solid content of 32.5% was recovered at the bottom of the reactor. It consisted of latex particles having 383 nm in diameter according to dynamic light scattering and coagulum was discernibly not formed within the polymerisation.

5.0 l of this polymer dispersion was freeze coagulated over night in a refrigerator. After thawing the material, the so-obtained sponge-like raw polymer was washed five times with demineralised water, the polymer was squeezed out and dried for 12 h in an oven at 130° C. Alternatively, the polymer dispersion was coagulated in an aqueous solution of MgCl$_2$, separated through a cheesecloth filter and dried in a circulating air oven set at 105° C. The material was then cooled below the Tg with liquid nitrogen and ground in a Wiley mill to a granular particle size. The polymer was translucent and did not show any sign of discoloration, it had a MFI(265/5) of 2.30 g/10' and a composition of 78 mol % VDF and 22 mol % HFP according to NMR. The polymer showed a reduced viscosity of 111.5 ml/g.

Fluoropolymers LCB FC-2 to LCB FC-6 were made according to a similar procedure but with appropriate modification to account of their different compositions. The composition and characteristics of the so prepared polymers are given in table 1.

TABLE 1 composition of LCB fluoropolymers

|  | LCB FC-1 | LCB FC-2 | LCB FC-3 | LCB FC-4 | LCB FC-5 | LCB FC-6 |
|---|---|---|---|---|---|---|
| amount of Me$_2$O [g] | 6 | 3.5 | 6 | 6.5 | 10 | 10 |
| amount of BDFE [mbar] | 450 | 450 | 225 | 805 | 225 | 805 |
| amount of BDFE [g] | 14 | 14 | 7 | 25 | 7 | 25 |
| polymerization time [min] | 241 | 221 | 207 | 323 | 282 | 367 |
| latex particle diameter [nm] | 383 | 445 | 405 | 399 | 400 | 403 |
| MFI(265/5) | 2.3 | 0.7 | 1.3 | 1.92 | 21.5 | 13 |
| $\eta_{red.}$ [ml/g] | 111.5 | 164.5 | 123.5 | 132 | 82 | 94.5 |
| [$\eta$] [ml/g] | 105.5 | 151.9 | 116.2 | 123.7 | 78.6 | 90.1 |
| $\eta_0$(265° C.) [Pa's] | 250000 | 700000 | 300000 | 575440 | 5105 | 17498 |
| LCBI | 0.81 | 0.51 | 0.69 | 0.78 | 0.24 | 0.34 |

Synthesis of LCB Fluoropolymers (LCB FC-7 and LCB FC-8)

LCB FC-7 and LCB FC-8, are fluoropolymers comprising a combination of the comonomers TFE/HFP/VDF 32/33/34 (mole %) further modified with respectively 0.38 mole % BTFE and 0.20 mole % BTFE. The so obtained LCB fluoropolymers had a LCBI of 4.35 and 3.41 respectively.

The polymer LCB FC-7 was made according to the following procedure:

A polymerization kettle with a total volume of 48.5 l (including feeding pipes) equipped with an impeller agitator system was charged with 29.0 l deionized water. The oxygen free kettle was then heated up to 70° C. and the agitation system was set to 240 rpm. The kettle was charged with 12.6 g dimethylether (Me2O), 252 g of a 30% aqueous solution of ammonium perfluorooctanoate (APFO) and 1608 g hexafluoropropylene (HFP) to a pressure of ~10.7 bar absolute then with 167 g vinylidenefluoride (VDF) to ~13.3 bar absolute and then with 254 g tetrafluoroethylene (TFE) to ~15.6 bar absolute reaction pressure. In the following, the stainless steel cylinder with a total volume of 5.3 l used as feeding line for HFP charged from a separate cylinder with 84 g BTFE. This separate BTFE feeding line allows a direct mass detection of the monomer introduced into the HFP cylinder. Then the HFP cylinder was rapidly charged (in order to ensure a sufficient dispersion of BTFE into HFP under turbulent flow conditions) with additional HFP, until a total monomer mass of 5000 g was reached.

The polymerization was initiated by the addition of 40 g aqueous ammonium peroxodisulfate (APS) dissolved into 120 ml water. As the reaction starts, the reaction temperature was maintained and the reaction pressure of 15.5 bar absolute was maintained by the feeding VDF, TFE and HFP/BTFE monomer blend into the gas phase with a feeding weight proportion TFE/HFP/VDF of 29.5/38.0/32.5. When a total feed of 4209 g VDF was reached in 265 min, the feed of the monomers was interrupted by closing the monomer valves. Within 10 minutes, the monomer gas phase was reacted down to a kettle pressure of 8.2 bar. Then the reactor was vented and flushed with $N_2$ in three cycles.

The so-obtained 40.5 kg polymer dispersion with a solid content of 30.9% was recovered at the bottom of the reactor. It consisted of latex particles having 87 nm in diameter according to dynamic light scattering and coagulum was discernibly not formed within the polymerization.

5.0 l of this polymer dispersion was freeze coagulated over night in a refrigerator. After thawing the material, the so-obtained sponge-like raw polymer was washed five times with demineralized water, the polymer was squeezed out and dried for 12 h in an oven at 130° C. Alternatively, the polymer dispersion was coagulated in an aqueous solution of $MgCl_2$, separated through a cheesecloth filter and dried in a circulating air oven set at 105° C. The material was then cooled below the Tg with liquid nitrogen and ground in a Wiley mill to a granular particle size. The polymer was translucent and did not show any sign of discoloration, it had a MFI(265/5) of 2.30 g/10' and a composition of 78 mol % VDF and 22 mol % HFP according to NMR. The polymer showed a reduced viscosity of 111.5 ml/g.

Fluoropolymers LCB FC-8 and C-3 were made according to a similar procedure but with appropriate adaptation to account for their different compositions as set out in table 2.

TABLE 2 composition of LCB fluoropolymers

|  | LCB FC-7 | LCB FC-8 | C-3 |
|---|---|---|---|
| Amount of Me2O [g] | 12.6 | 11.0 | 10.3 |
| Amount of APFO [g] | 252 | 252 | 252 |
| Amount of BTFE [g] | 84 | 45 | 175 |
| Amount of BTFE [% mol] | 0.38 | 0.20 | 0.78 |
| Polymerization time [min] | 265 | 240 | 296 |
| Latex particle diameter [nm] | 87 | 99 | 93 |
| MFI(265/5) | 1.3 | 1.3 | 0.5 |
| $\eta_{red.}$ [ml/g] | 54 | 56 | 25 |
| [$\eta$] [ml/g] | 52.5 | 54.4 | 24.7 |
| $\eta_0$(265° C.) [Pa's] | 8.749E+06 | 3.491E+06 | 2.538E+10 |
| LCBI | 4.35 | 3.41 | 44.0 |

Synthesis of LCB Fluoropolymers LCB FC-9 to LCB FC-11

LCB Fluoropolymers LCB FC-9 to LCB FC-12 were made by a grafting or slight cross-linking reaction of a TFE/HFP/VDF terpolymer, commercially available as THV 200 from 3M Company.

A round bottom flask, cleaned and dried in an oven at 100° C., was charged with 6 g THV 200. The flask was flushed with argon or nitrogen atmosphere and sealed by a rubber septum. To maintain pressure in the flask after it had been flushed, a balloon filled with argon or nitrogen was attached to the flask. 150 ml of anhydrous tetrahydrofuran (THF) were added via a syringe and the mixture was stirred until the polymer was dissolved. A stoechiometric amount, as to obtain the desired reaction level, of a 2 g/100 ml solution of 1,8-diazabicyclo [5.4.0]-undec-7-ene (DBU) in THF were added. The mixture changed from colourless to orange. The mixture was allowed to stir for 29 hours. The polymer was purified by precipitating in deionised water after which it was dissolved in THF. The polymer was precipitated in heptane, separated and dried under vacuum at 70° C. The LCBI values and zero shear rate viscosities for LCB FC-9 through LCB FC-11 are recorded in table 3.

TABLE 3 composition of LCB Fluoropolymers

| LCB FC | g THV wt | g DBU | LCBI | $\eta_0$ (Pa's) |
|---|---|---|---|---|
| LCB FC-9 | 6.07 | 0.0075 | 0.38 | 4260 |
| LCB FC-10 | 6.12 | 0.0151 | 0.50 | 4820 |
| LCB FC-11 | 6.07 | 0.0260 | 0.40 | 1870 |

Evaluation of LCB Fluoropolymers as Polymer Melt Processing Additives

Examples 1 to 6 and Comparative Examples C-1 and C-2

In examples 1 to 6, the LCB fluoropolymers LCB FC-1 to LCB FC-6 were tested for their performance as a polymer melt processing additive. Comparative example C-1 was made using a $VDF_{78}/HFP_{22}$-copolymer as disclosed in WO 02 88,207. The copolymer had a reduced viscosity of $\eta_{red.}$=118 ml/g, a zero shear viscosity $\eta_0$(265° C.)=2.6×10$^4$ Pa's and a LCBI of 0.16. Comparative example C-2 was made with a commercially available processing aid Viton™

Z-200 from Dow DuPont Elatomers (DDE) containing a $VDF_{78}/HFP_{22}$-copolymer (determined with NMR) that has a $\eta_{red.}$=121.5 ml/g, a zero shear viscosity $\eta_0$(265° C.)=3.03× $10^7$ Pa's and a LCBI of 2.81.

In a first step, the fluoropolymers LCB FC-1 to LCB FC-6 were blended with polyethylene glycol in a ratio 1:2. The mixtures of fluoropolymer and PEG are further referred to as PPA. The polyolefin used for the test was a commercially available butene modified linear low density polyethylene (LLDPE from ExxonMobil) with MFI(190/2.16) of 0.7 g/10' (host resin). Prior to extrusion, a masterbatch of the PPA was compounded to 2 wto/o additive concentration in a carrier resin (LLDPE from ExxonMobil) with MFI(190/2.16) of 2.8 g/10'. Sufficient tumbling provided the blending of the LLDPE host resin with the LLDPE carrier resin, the so-obtained concentration of the PPA in the LLDPE was 400 ppm. 2% FSU 105E (comprising slip and antiblock agent, available from A. Schulman) was added to complete the formulation.

The extrusion experiments were carried out on a lab scale Collin blown film line of the following components:

| Motor: | performance 16 kW | |
|---|---|---|
| Screw: | sections 5/10/10 | compression ration: 2.73 |
| | diameter: 45 mm | length: 25 × D |
| Die: | diameter: 50 mm | gap: 0.6 mm, dual lip air ring |
| Tower: | Height: 3.14–4.44 m | bubble stabilization cage |

With a screw speed of 46 rpm the extruder output was 11 kg per hour, the temperature profile was the following:

| zone 1: | 205° C. |
|---|---|
| zone 2: | 205° C. |
| zone 3: | 210° C. |
| zone 4: | 220° C. |
| die: | 205° C. |

A baseline condition was established by running the host resin formulation for at least 60 minutes. The extruder gate pressure, melt temperature, and the condition of the film were recorded at this time. A full set of extrusion conditions were recorded every 5 minutes (e.g. gate pressure, $p_{gate}$). Once the baseline for the resin to be evaluated was established, the resin containing 400 ppm PPA (blend resin of carrier and host resin) was charged to the extruder and the time was recorded. At 5 minutes intervals a film sample was taken and inspected visually in terms of melt fracture elimination (% MF). If melt fracture was reduced to 0 percent in 60 minutes, the data point was complete. If not, the PPA level was increased to 600 ppm and the process was repeated for maximum another 60 minutes.

The results are summarized in Tables 4 and 5.

TABLE 4

Extrusion data of comparative examples

| | Comparative Example 1 (C-1) | | Comparative Example 2 (C-2) | |
|---|---|---|---|---|
| Time [min] | $p_{gate}$[bar] | MF [%] | $p_{gate}$[bar] | MF [%] |
| 0 | 329 | (100) | 304 | (100) |
| 5 | 323 | (100) | 299 | (98.8) |
| 10 | 307 | (89) | 260 | 37.6 |
| 15 | 278 | 37 | 238 | 16.3 |
| 20 | 265 | 29 | 233 | 10.6 |
| 25 | 250 | 17 | 228 | 8.4 |
| 30 | 241 | 13 | 226 | 6.7 |
| 35 | 236 | 8.8 | 225 | 4.3 |
| 40 | 231 | 7.4 | 222 | 3.2 |
| 45 | 227 | 5.4 | 220 | 3.1 |
| 50 | 224 | 4.8 | 220 | 2.4 |
| 55 | 221 | 3.6 | 218 | 1.4 |
| 60 | 218 | 3 | 216 | 1.2 |
| 65 | 218 | 2.2 | 214 | 0.8 |
| 70 | 214 | 2 | 213 | (0.2) |
| 75 | 212 | 1.3 | 214 | (0) |
| 80 | 210 | 0.96 | — | — |
| 85 | 209 | 0.64 | — | — |
| 90 | 208 | 0.64 | — | — |
| 95 | 208 | 0.53 | — | — |
| 100 | 207 | 0.48 | — | — |
| 105 | 206 | 0.43 | — | — |
| 110 | 206 | (0.05) | — | — |
| 115 | 205 | (0) | — | — |

TABLE 5 extrusion data for LLDPE comprising PPA

| Time | Ex 1 (LCB FC-1) | | Ex 2 (LCB FC-2) | | Ex 3 (LCB FC-3) | | Ex 4 (LCB FC-4) | | Ex 5 (LCB FC-5) | | Ex 6 (LCB FC-6) | |
|---|---|---|---|---|---|---|---|---|---|---|---|---|
| [min] | $p_{gate}$[bar] | MF [%] | $p_{gate}$[bar] | MF [%] | $p_{gate}$[bar] | MF [%] | $p_{gate}$[bar] | MF [%] | $p_{gate}$[bar] | MF [%] | $p_{gate}$[bar] | MF [%] |
| 0 | 304 | (100) | 305 | (100) | 305 | (100) | 300 | (100) | 300 | (100) | 300 | (100) |
| 5 | 300 | (100) | 302 | (100) | 301 | (100) | 285 | 99.8 | 296 | (100) | 295 | (100) |
| 10 | 286 | (100) | 294 | (100) | 292 | (100) | 226 | 27.3 | 292 | (100) | 382 | (100) |
| 15 | 275 | 91 | 283 | (98.3) | 281 | 92.4 | 217 | 5.2 | 285 | (100) | 270 | 99.4 |
| 20 | 266 | 17.2 | 275 | 67.9 | 269 | 34.9 | 213 | 2.7 | 275 | 91.6 | 250 | 42.5 |
| 25 | 258 | 3.5 | 271 | 9.2 | 268 | 10 | 211 | 0.2 | 268 | 26.6 | 243 | 15.5 |
| 30 | 255 | 0.5 | 269 | 2.7 | 265 | 1.4 | 209 | (0.2) | 261 | 10.6 | 238 | 5.8 |
| 35 | 253 | 0.2 | 268 | 1.2 | 263 | 0.4 | 207 | (0) | 260 | 4.8 | 236 | 0.2 |
| 40 | 252 | (0) | 268 | 1.0 | 263 | 0.2 | — | — | 258 | 2.3 | 234 | (0) |
| 45 | — | — | 268 | 0.8 | 261 | 0.1 | — | — | 257 | 0.4 | — | — |
| 50 | — | — | 267 | 0.3 | 259 | (0) | — | — | 256 | 0.2 | — | — |
| 55 | — | — | 267 | 0.2 | — | — | — | — | 255 | (0) | — | — |

TABLE 5-continued extrusion data for LLDPE comprising PPA

| Time | Ex 1 (LCB FC-1) | | Ex 2 (LCB FC-2) | | Ex 3 (LCB FC-3) | | Ex 4 (LCB FC-4) | | Ex 5 (LCB FC-5) | | Ex 6 (LCB FC-6) | |
|---|---|---|---|---|---|---|---|---|---|---|---|---|
| [min] | $p_{gate}$[bar] | MF [%] | $p_{gate}$[bar] | MF [%] | $p_{gate}$[bar] | MF [%] | $p_{gate}$[bar] | MF [%] | $p_{gate}$[bar] | MF [%] | $p_{gate}$[bar] | MF [%] |
| 60 | — | — | 266 | 0.2 | — | — | — | — | — | — | — | — |
| 65 | — | — | 262 | 0.2 | — | — | — | — | — | — | — | — |
| 70 | — | — | 257 | 0.1 | — | — | — | — | — | — | — | — |
| 75 | — | — | 253 | (0) | — | — | — | — | — | — | — | — |

The melt fracture elimination data summarized in Tables 4 and 5 can well be linearized, if the Y-axis is plotted in log scale versus the extrusion time on the X-axis plotted in linear scale (the data in brackets were not included in this consideration). Herein, the data are approximated using a linear function of the general type $$\log \{\text{melt fracture [\%]}\} = b_0 - b_1 \times t[\min]$$

wherein the coefficient $b_1$, the slopes of the regression lines, quantifies the rate of melt fracture elimination. The coefficients $b_0$ and $b_1$ as well as the correlation coefficients $r^2$ are summarized in Table 6.

TABLE 6

| Ex | $b_0$ | $b_1$ | $r^2$ | Time (min) to zero % MF |
|---|---|---|---|---|
| Example 1 | 3.97 | 0.137 | 0.99 | 40 |
| Example 2 | 2.11 | 0.048 | 0.87 | 75 |
| Example 3 | 3.53 | 0.106 | 0.98 | 50 |
| Example 4 | 3.70 | 0.128 | 0.97 | 35 |
| Example 5 | 3.70 | 0.088 | 0.99 | 55 |
| Example 6 | 4.10 | 0.125 | 0.90 | 40 |
| C-1 | 1.78 | 0.022 | 0.99 | 115 |
| C-2 | 1.65 | 0.027 | 0.97 | 75 |

As can be seen from the slopes of the two regression functions above, the fluoropolymer of Examples 1 to 6 clearly outperform the comparative fluoropolymers. Note e.g. that the fluoropolymer from Example 1 clears the melt fracture of LLDPE by a factor of 6.2 faster than the material of Comparative Example C-1 and by factor of 5.1 faster than the material of Comparative Example C-2.

Examples 7 and 8 and Comparative Examples C-3

In examples 7 and 8, a PPA was made in the same way as for examples 1-6, using butene modified linear low density polyethylene (grade LL 1001.32) from ExxonMobil with MFI (190/2.16) of 1 g/10' (host resin).

Prior to extrusion, a masterbatch of the PPA was compounded to 3% additive concentration in a carrier resin (Escorene™ 5009.20 LLDPE from ExxonMobil) with MFI (190/2.16) of 2 g/10'. Sufficient tumbling provided the blending of the LLDPE host resin with the LLDPE carrier resin, the so-obtained concentration of the PPA in the LLDPE was 750 ppm. 3000 ppm Chimassorb 994 from CIBA Specialty Chemicals was added to complete the formulation. The extrusion experiments were carried out on a lab scale Kiefel blown film line. The Kiefel film line consisted of a 40-mm extruder and die, 24/1 L/D, 0.6 mm die gap, spiral die design and a single lip air ring. Before each blown film line test, the equipment was purged and cleaned of residual PPA by extruding a 30% silica masterbatch. The base resin was then added and extruded until a constant pressure condition was obtained (generally for 1 hour). The base resin blended with PPA masterbatch was then extruded during 1 hour. The residual melt fracture was recorded.

Comparative example C-3 was made with a PPA comprising a TFE/HFP/VDF 32/33/34 polymer modified with 0.78 mole % BTFE and characterized by a LCBI of 44. The results of melt fracture and pressure are recorded in table 7.

TABLE 7

Extrusion of LLDPE 1001.32 comprising PPA

| | Ex 7 (LCB FC-7) | | Ex 8 (LCB FC-8) | | C-3 | |
|---|---|---|---|---|---|---|
| Time [min] | $p_{gate}$ [bar] | MF [%] | $p_{gate}$ [bar] | MF [%] | $p_{gate}$ [bar] | MF [%] |
| 0 | 143 | 100 | 150 | 100 | 145 | 100 |
| 10 | 145 | 99.5 | 149 | 99.5 | 146 | 100 |
| 20 | 136 | 60.0 | 138 | 30.0 | 147 | 100 |
| 30 | 129 | 12.0 | 131 | 11.0 | 145 | 99.5 |
| 40 | 123 | 4.0 | 127 | 4.0 | 140 | 98.0 |
| 50 | 122 | 1.0 | 123 | 2.0 | 135 | 93.0 |
| 60 | 122 | 0.5 | 121 | 1 | 131 | 90.0 |

Examples 9 to 12

Examples 9 to 12 were made with chemical modified terpolymers LCB FC-9 to LCB FC-12 in the PPA. These additives were tested by rheometry. Therefore, formulations were prepared using a Haake Rheocord™ System 40 torque rheometer and Rheomix™ 3000E mixing bowl attachment fitted with roller blades. The additives were compounded in a butene modified linear low density polyethylene (grade LL 1001.32) from ExxonMobil with MFI (190/2.16) of 1 g/10' (host resin). The mixing sequence began with a two minute material loading period at 15 rpm, during the third minute the rotor speed was increased to 50 rpm and held constant for the duration. The temperature of the bowl was initially programmed at 180° C. for two minutes and then decreased to 160° C. over one minute and kept at that temperature for the rest of the duration. The entire mixing cycle lasted for eight minutes. Total batch size was 190 grams, final melt temperatures of the sample were in the range of 180° C. to 200° C. Masterbatch concentrates of fluoropolymers were prepared at a 1% level with a total batch size of 190 grams in resin A, and the mixture was allowed to cool below its melt temperature. The cooled mixture was chopped into small pieces with a hydraulic bale cutter.

Compositions containing lower fluoropolymer concentrations were prepared by diluting the above-described 1% fluoropolymer concentrate with more polyethylene resin using the procedure described above to mix the desired amounts of polyethylene and fluoropolymer concentrate. Typical fluoropolymer test levels were 1000 ppm. The cooled mixtures were again chopped and then ground at ambient temperature in Retschmuhle grinder.

The performance of the additives was evaluated on an Instron Capillary Rheometer (ICR) at 190° C. Experiments were conducted using an Instron™ 4202 mainframe fitted with a 3210 capillary rheometer barrel. The die was a slit made of stackable components. The die dimensions were 3.81 mm wide and 14.45 mm long with a die gap of 0.254 mm. Test temperatures was 190° C. Ground samples prepared according to the method above were packed into the rheometer barrel and allowed to dwell for 10 minutes. This was done to ensure a uniform melt temperature before the testing began.

Using a freshly cleaned die, samples were extruded at a shear rate of 200 s$^{-1}$, a strip chart recorder displayed the pressure on the capillary piston versus time and a computer equipped with a data acquisition card was used to record the pressure data. As a sample containing a fluoropolymer additive was extruded, the pressure would decrease, indicating if the fluoropolymer was serving to reduce the required force of extrusion. When the pressure reached equilibrium the final pressure was recorded. If a sample had not reached equilibrium by the end of the test barrel, the barrel was reloaded and the test continued.

At the conclusion of each test, the capillary die was removed, and the barrel cleaned with a brush and cotton gauze. The die was dismantled and the die faces were soaked in butanone in a sonic bath for 15 minutes.

The base resins, without fluoropolymer additives, were tested in the same manner to establish base lines for comparison. Using these baselines, the percent decrease in extrusion pressure provided by the presence of a fluoropolymer can be determined. Here, the load on the piston of the rheometer is directly proportional to the pressure and was used for the calculation. The percent decrease is defined here as the difference in load for a polymer without fluoropolymer (L) and with fluoropolymer additive ($L_{ad}$), divided by the load for the base polymer without the fluoropolymer (L), % decrease=(L−$L_{ad}$)/L. This value is usually reproducible within 2%. The data of pressure reduction are given in table 8.

TABLE 8

| Ex No | Melt additive | % Pressure reduction |
|---|---|---|
| Ex 9 | LCB FC-9 | 70.7 |
| Ex 10 | LCB FC-10 | 73.9 |
| Ex 11 | LCB FC-11 | 66.1 |
| Ex 12 | LCB FC-12 | 63.4 |

It can be seen from the above table that the fluoropolymers LCB FC-9 to LCB FC-12 according to the invention are highly effective in reducing the extrusion pressure.

What is claimed is:

1. Melt-processible polymer composition comprising (a) a non-fluorinated melt-processible polymer; and (b) a fluoropolymer derived from the copolymerization of:
   (1) at least 20% by weight of vinylidene fluoride,
   (2) one or more fluorinated monomers, and
   (3) one or more modifiers selected from (i) olefins having a bromine or iodine atom bonded to a carbon of the double bond of the olefins, (ii) olefins corresponding to formula (IV):

$$X^a{}_2C=CX^a-R_f-(X^b)_r \quad (IV)$$

wherein each $X^a$ independently represents hydrogen, fluorine, or chlorine, $R_f$ is a perfluoroalkylene group, a perfluorooxyalkylene group or a perfluoropolyether group, $X^b$ is Br or I and r is 1, 2 or 3 and (iii) mixtures thereof, and wherein the one or more modifiers are included in an amount not more than 1.0% by weight and is sufficient to form long chain branching in the fluoropolymer without the formation of gels.

2. A melt-processible polymer composition according to claim 1, wherein the modifier is included in an amount of 0.01% by weight to 1.0% by weight.

3. A melt-processible polymer composition according to claim 1, wherein the modifier is included in an amount of 0.05% by weight to 0.5% by weight.

4. A melt-processible polymer composition according to claim 1, further comprising a synergist.

5. A melt-processible polymer composition according to claim 1, wherein the melt-processible composition is extruded, blow molded, or injection molded.

6. Polymer melt additive composition for use as a processing aid in the extrusion or a non-fluorinated polymer, the polymer melt additive composition comprising a fluoropolymer derived from the copolymerization of (a) at least 20% by weight of vinylidene fluoride, (b) one or more fluorinated monomers, and (c) one or more modifiers selected from (i) olefins having a bromine or iodine atom bonded to a carbon of the double bond of the olefin, (ii) olefins corresponding to formula (IV)

$$X^a{}_2C=CX^a-R_f-(X^b)_r \quad (IV)$$

wherein each $X^a$ independently represents hydrogen, fluorine, or chlorine, $R_f$ is a perfluoroalkylene group, a perfluorooxyalkylene group or a perfluoropolyether group, $X^b$ is Br or I and r is 1, 2 or 3 and (iii) mixtures thereof, wherein the one or more modifiers are included in an amount not more than 1.0% by weight and is sufficient to form long chain branching in the fluoropolymer without the formation of gels, and the fluoropolymer is a processing aid in the melt processing of a non-fluorinated polymer.

7. A polymer melt additive composition according to claim 6, wherein the polymer melt additive composition when extruded with a non-fluorinated polymer, eliminates melt fracture in the non-fluorinated polymer at lower amounts than a comparative polymer melt additive composition derived from said fluoropolymer that does not consist of the one or more modifiers.

8. A polymer melt additive composition according to claim 6, wherein the polymer melt additive composition when extruded with a non-fluorinated polymer, eliminates melt fracture in the non-fluorinated polymer at lower amounts than a comparative polymer melt additive composition derived from said fluoropolymer that does not consist of the one or more modifiers.

9. A polymer melt additive composition according to claim 6, wherein the modifier is included in an amount of 0.01% by weight to 1.0% by weight.

10. A polymer melt additive composition according to claim 6, further comprising a synergist.

11. A polymer melt additive composition according to claim 6, wherein the modifier is selected from 1-bromo-1,2,2,-trifluoroethylene, vinylbromide, 1,1-dibromoethylene, 1,2-dibromoethylene, 1-bromo-2,3,3,3-tetrafluoro-propene, and 1-bromo-2.2-difluoroethylene.

12. A polymer melt additive composition according to claim 6, wherein the fluoropolymer has a zero shear rate viscosity at 265° C. of not more than 10$^7$ Pa's.

* * * * *

UNITED STATES PATENT AND TRADEMARK OFFICE
CERTIFICATE OF CORRECTION

PATENT NO. : 7,375,157 B2  Page 1 of 2
APPLICATION NO. : 10/864054
DATED : May 20, 2008
INVENTOR(S) : Stephen E. Amos It is certified that error appears in the above-identified patent and that said Letters Patent is hereby corrected as shown below:

Column 6
Line 67 (approx.), delete "—O(R$^1_f$O)$_n$ (R$^2_f$O)$_m$R$^3$f" and insert in place thereof -- -O(R$^1_f$O)$_n$ (R$^2_f$O)$_m$R$^3$f --.

Column 7
Line 4, delete "R$^3$f" and insert in place thereof -- R$^3_f$ --.

Column 13
Line 18, delete "pigrnents" and insert in place thereof -- pigments --.

Column 14
Line 62, delete "$\eta_{red}$." and insert in place thereof -- $\eta_{red.}$ --.

Line 63, delete "$\eta_{red}$." and insert in place thereof -- $\eta_{red.}$ --.

Line 65, delete "$\eta_{red}$." and insert in place thereof -- $\eta_{red.}$ --.

Column 15
Line 15, delete "Zetazizer" and insert in place thereof -- Zetasizer --.

Column 19
Line 1, delete "Elatomers" and insert in place thereof -- Elastomers --.

Line 12, delete "wto/o" and insert in place thereof -- wt% --.

Column 23
Line 62 (approx.), in Claim 1, delete "olefins," and insert in place thereof -- olefin, --.

UNITED STATES PATENT AND TRADEMARK OFFICE
CERTIFICATE OF CORRECTION

PATENT NO. : 7,375,157 B2
APPLICATION NO. : 10/864054
DATED : May 20, 2008
INVENTOR(S) : Stephen E. Amos It is certified that error appears in the above-identified patent and that said Letters Patent is hereby corrected as shown below:

Column 24
Line 19 (approx.), in Claim 6, delete "or" and insert in place thereof -- of --.

Line 40 (approx.), in Claim 7, delete "eliminates" and insert in place thereof -- reduces --.

Line 41-42 (approx.), in Claim 7, delete "at lower amounts" and insert in place thereof -- faster --.

Line 62, in Claim 11, delete "2.2-" and insert in place thereof -- 2,2 --.

Signed and Sealed this

Twenty-third Day of September, 2008

JON W. DUDAS
*Director of the United States Patent and Trademark Office*